Oct. 9, 1962 R. W. HENKE ETAL 3,057,161
HYDRAULIC MOTOR
Filed April 5, 1961 3 Sheets-Sheet 1

Inventors.
Russell W. Henke.
Edward O. Brannon.
Clare E. Hellenberg.
Lazarus Harry Dadian.
By Hofgren, Brady
Wegner, Allen & Stellman
Attorneys.

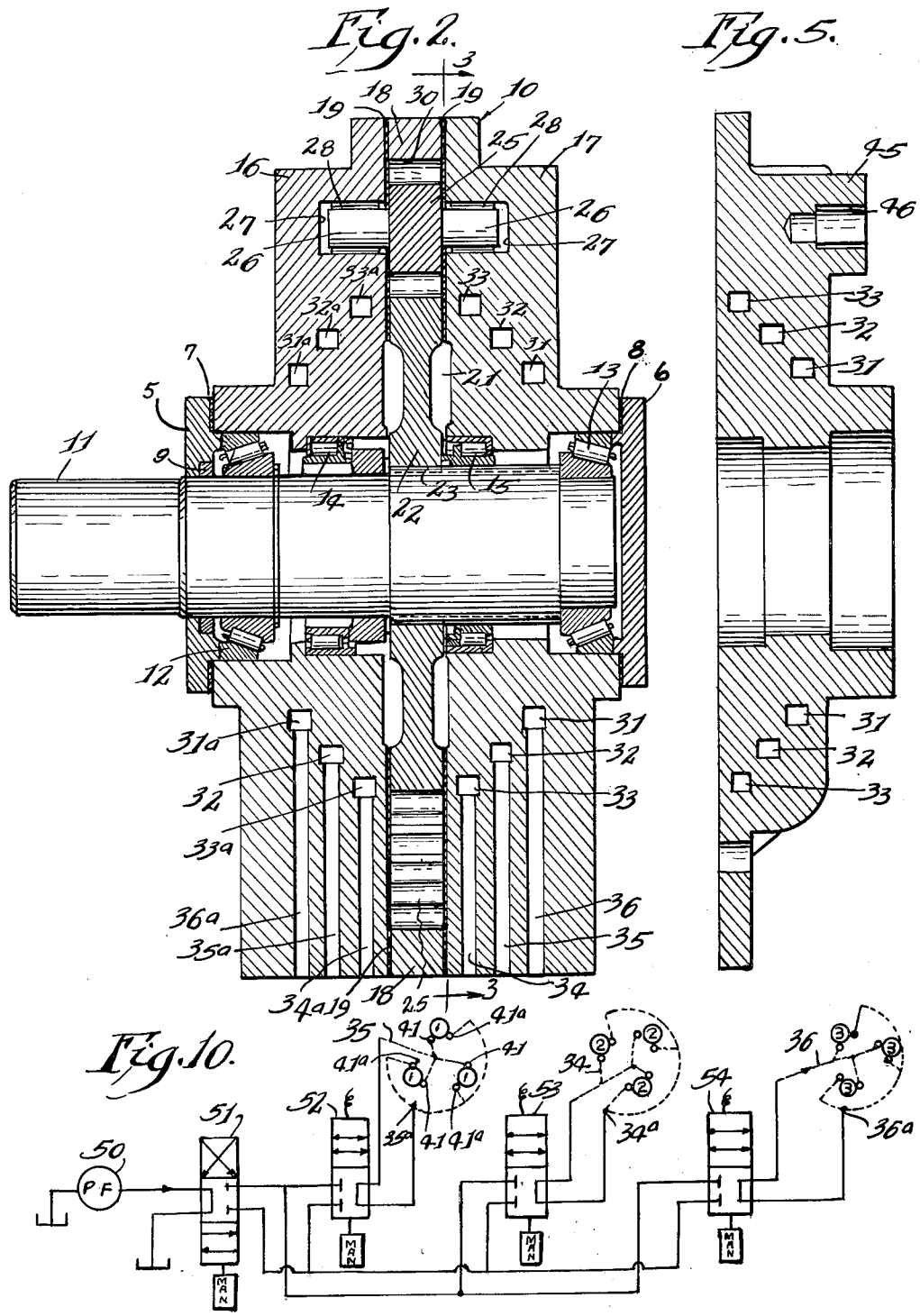

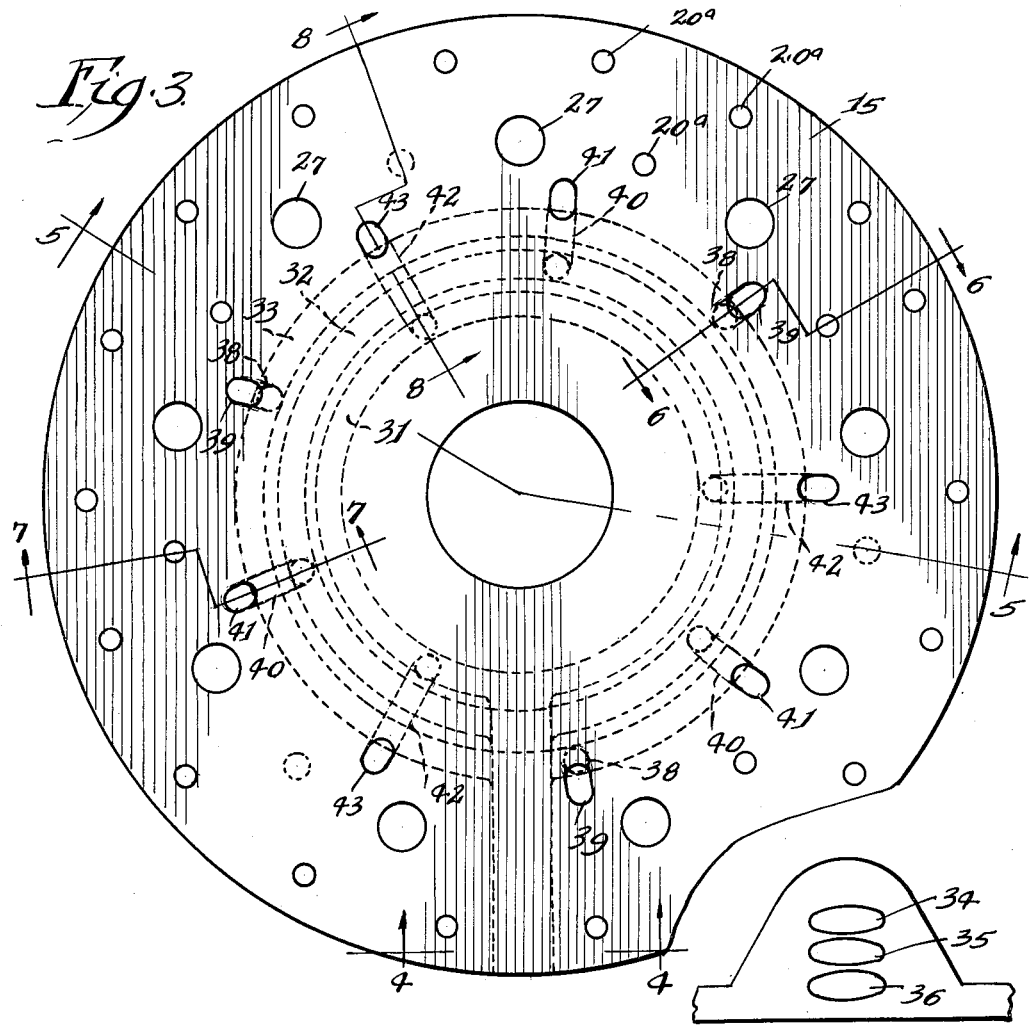

United States Patent Office 3,057,161
Patented Oct. 9, 1962

3,057,161
HYDRAULIC MOTOR
Russell W. Henke, Elm Grove, and Edward O. Brannon, Clare E. Hellenberg, and Lazarus Harry Dadian, Racine, Wis., assignors to Racine Hydraulics & Machinery, Inc., a corporation of Wisconsin
Filed Apr. 5, 1961, Ser. No. 100,859
5 Claims. (Cl. 60—53)

This invention relates to a hydraulic motor and more particularly to a gear type, high torque, low speed hydraulic motor.

The usual method of attaining various output speed ranges and torques from a hydraulic motor is to use the motor in combination with a variable displacement fluid pump, a multiple stage fluid pump, or both.

A principal object of this invention is to provide a hydraulic motor that can be driven by a fixed displacement fluid pump running at a constant speed in which the motor has varying speed and torque outputs.

Another object of this invention is to provide a hydraulic motor having an output shaft connected to a main gear that is driven by a set of pinion gears, each gear defining with the main gear a fluid motor around the main gear periphery in equally spaced relation to obtain both mechanical and hydraulic balance of the main gear.

A further object is to provide a motor as defined in the preceding paragraph in which there are a plurality of sets of pinion gears with means to drive only one set to provide a high speed, low torque output at the shaft, or to drive more sets of said pinion gears to provide a lower speed and higher torque output on the shaft.

Another object is to provide such a motor with a housing surrounding the main gear and pinion gears and having a plurality of pressure fluid passages within the housing connected one with each of the sets of gears, and means for selectively supplying pressure fluid to one or more of the passages to rotate the respective sets of gears connected therewith and drive the output shaft.

Other objects and advantages will become apparent from the following detailed description taken in connection with the accompanying drawings, in which:

FIGURE 2 is a vertical section taken substantially along the line 2—2 of FIGURE 1;

FIGURE 3 is an elevational view of the inside surface of a portion of the motor housing taken substantially along the line 3—3 of FIGURE 2;

FIGURE 4 is a fragmentary sectional view taken substantially along the line 4—4 of FIGURE 3;

FIGURE 5 is a sectional view of a housing portion taken substantially along the line 5—5 of FIGURE 3;

FIGURE 6 is a fragmentary sectional view taken substantially along the line 6—6 of FIGURE 3;

FIGURE 7 is a fragmentary sectional view taken substantially along the line 7—7 of FIGURE 3;

FIGURE 8 is a fragmentary sectional view taken substantially along the line 8—8 of FIGURE 3;

FIGURE 10 is a schematic diagram showing the control circuit for the hydraulic motor.

Figure 1:
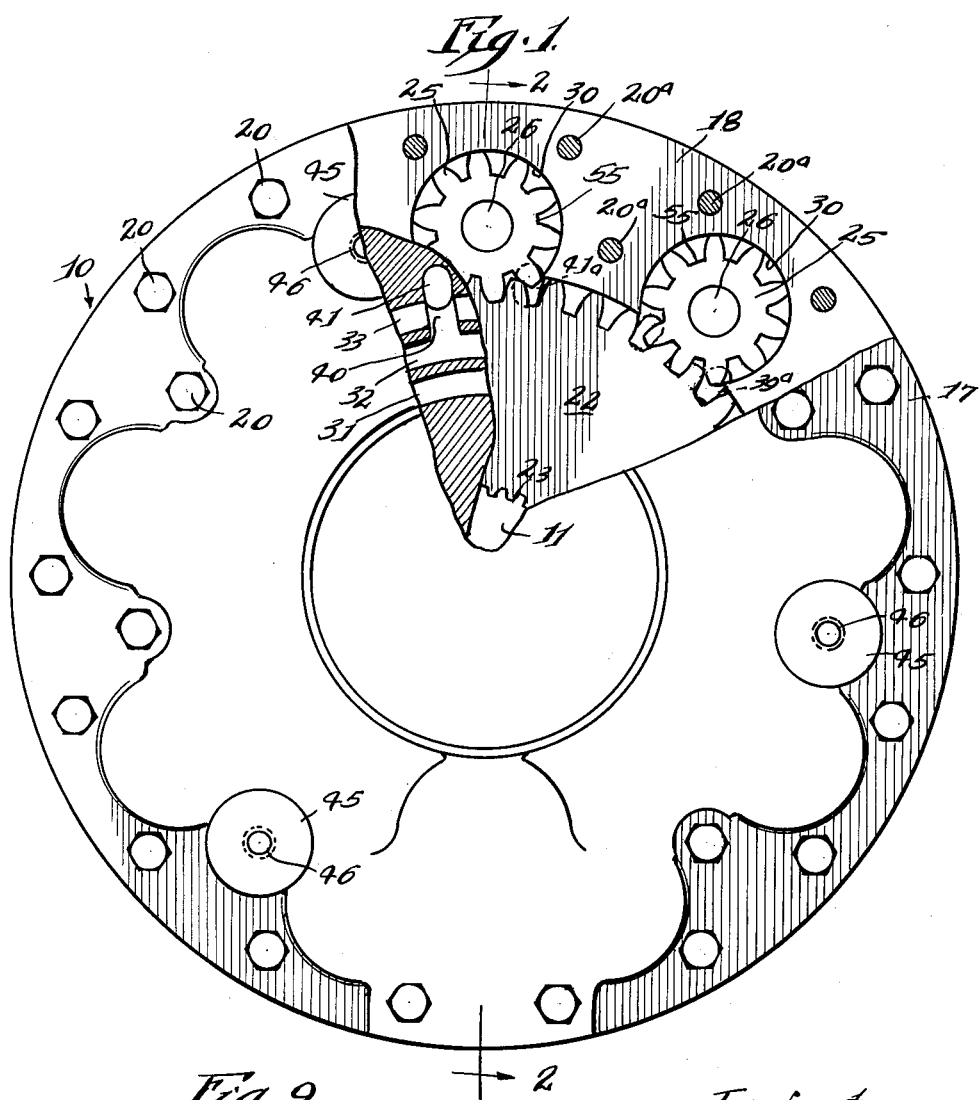
FIGURE 1 is an elevational view of a hydraulic motor embodying the invention with parts broken away to more clearly show the construction.

While this invention is susceptible of embodiment in many different forms, there is shown in the drawings and will herein be described in detail the embodiment of the invention with the understanding that the present disclosure is to be considered an exemplification of the principles of the invention and is not intended to limit the invention to the embodiment illustrated. The scope of the invention will be pointed out in the appended claims.

The hydraulic motor embodying the invention is generally shown in FIGURES 1 and 2, and comprises a housing, indicated generally at 10, having a central bore therethrough and a shaft 11 that is rotatably mounted in bearings 12 and 13 provided in the central bore adjacent each side of the housing. Suitable seals 14 and 15 are provided between the housing and the shaft to prevent fluid leakage. Shaft covers 5 and 6 are provided at each opening of the central bore and sealing gaskets 7 and 8 are located between the housing ends and the covers. A lip seal 9, carried by shaft cover 5 surrounds shaft 11 preventing dirt from contaminating the bearing 12 and oil from escaping the motor. The housing 10 consists of two identical housing members 16 and 17 and a spacer ring 18 positioned therebetween. A thin wear plate 19 is provided over the inside surface faces of the housing members 16 and 17 and the faces are spaced from one another by the spacer ring 18 and secured together by bolts 20 inserted through a plurality of holes 20a spaced around the periphery of the housing. A cavity 21 formed between the two spaced faces of the housing members contains a main gear or bull-gear 22 splined to and loosely mounted for rotation on the shaft 11 at 23 and rotatable therewith. A plurality of small pinion gears 25 are equally spaced about the periphery of the main gear and are in mesh therewith to form a driving connection. The pinion gears 25 have shafts 26 extending from either side thereof. Suitable recesses 27 are provided in the housing members 16 and 17 to receive the shafts 26, and bearings 28 are provided within the recesses to journal the shafts.

The main gear 22 is supported by the equally spaced pinions 25 that are mounted about its periphery, and floats, in static balance forcewise, within the nest of pinion gears. The main gear 22 is not supported on the shaft 11 nor carried by any type of bearings, but rather, floats around the shaft 11 and always seeks a balanced condition. Because of the clearances at the spline 23, only torque is transmitted, and any shaft deflection is isolated from the pinion gears. This minimizes the major cause of binding, friction and loss of mechanical efficiency of the hydraulic motor.

If the shaft 11 and bearings 12 and 13 were removed from the motor housing, the main gear 22 would remain floating in static balance in the nest of pinions. The motor could then be used as a torque-arm unit whereby the main gear 22 would be loosely connected for rotation on a splined load shaft to be driven.

The spacer ring 18 has an inner diameter slightly larger than the outside diameter of the main gear 22 so that the gear may rotate therein and is provided with partial circular cutout sections 30 around the circumference thereof that are open at the inner periphery and associated one with each of the pinion gears to form a partial cavity with the faces of the housing members about each pinion.

FIGURE 3 shows the internal face of the housing member 17 which, as mentioned before, is identical to the housing member 16, and the following description relating to the construction of one applies equally well to the other. The recesses 27 that receive the shafts 26 of the pinion gears are equally spaced about the circumference of the housing member 17, and in the described embodiment there are nine such recesses to support nine separate pinions. The pinion gears are divided into sets of three with the gears in each group being equally spaced about the periphery of the main gear and forming individual motor units.

A series of three internal annular passageways 31, 32 and 33 are provided in the housing member 17, each of which is connected to associated openings 34, 35 and 36, respectively, located in the outer peripheral surface of the housing member 17. Each of the openings is an inlet for supplying fluid to each set of gears. Similar annular passageways 31a, 32a and 33a are connected with similar openings 34a, 35a and 36a in the housing member which are corresponding outlets for the fluid from the gear sets (see FIGURES 2 and 4). Each of the three passageways has three equally spaced channels extending generally radially outward therefrom that terminate in openings or ports in the face of the housing member 17. For example, in FIGURE 3, three equally spaced channels 38 are connected to the passageway 33 and extend generally radially outward and toward the face of the housing member 17 to terminate in port openings 39 each of which is located adjacent one of three pinion gears that form a set of individual motor units. Similarly, the passageway 32 has three channels 40 terminating in port openings 41 associated with three pinions of a second set of motor units, and the passageway 31 has three channels 42 terminating in port openings 43, associated with three pinions of a third motor unit set. See FIGURES 3, 6, 7 and 8. It is apparent from the foregoing description that pressure fluid supplied to the opening 34 will enter the internal passage 31 and flow through the channels 42 to the ports 43. In the same manner pressure fluid entering the housing member at 35 is discharged through the ports 41 and fluid entering at 36 is discharged through the ports 39.

Referring to FIGURE 1, it can be seen that one of the ports 41 on the face of the housing member 17 opens at a point where the pinion gear begins to mesh with the main gear 22 and a corresponding opening 41a in the other housing member 16 opens on the other side of the pinion gear at a point of mesh remote from the opening 41. The remaining two ports 41, connected to the passageway 32 are similarly positioned at the other two pinion gears of a motor unit set and have ports 41a associated therewith. In the same manner the ports 39 and the ports 43 and their corresponding ports 39a and 43a are associated with other individual motor unit sets.

Three equally spaced mounting surfaces including bosses 45 are provided on the outer surfaces of the housing 10, each having a threaded bolt hole 46 for mounting the hydraulic motor to a support, see FIGURES 1, 5 and 8.

To rotate the shaft 11, fluid under pressure can be supplied through the opening 35, enter the passageway 32 and be discharged through the three ports 41 to the associated pinion gears of a motor unit set, rotate the pinions and drive the main gear 22.

The equal spacing of the three pinions of each individual motor unit set about the main gear periphery gives mechanical and hydraulic dynamic balance to the main gear.

If additional power is required from the motor, pressurized fluid can, in addition to being supplied through the opening 35, be supplied through the opening 36, to the internal passage 31 and the three ports 43 to rotate an additional motor unit set of three pinion gears. Similarly, fluid can be introduced through the opening 34 to the internal passageway 33 and the ports 39 to drive still another motor unit set to obtain maximum power output from the hydraulic motor.

Figure 9:
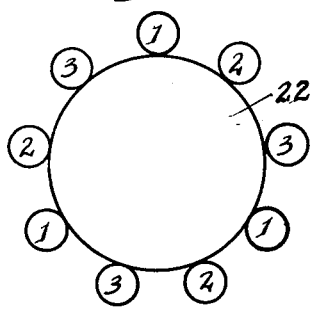
FIGURE 9 is a schematic arrangement of the gear units of the hydraulic motor.

The foregoing can more clearly be illustrated by the schematic gear arrangement shown in FIGURE 9 whereby the main gear 22 has nine pinion gears in driving contact around the periphery thereof. The pinion gears are divided into sets of three equally spaced gears, as set 1–1–1, set 2–2–2, and set 3–3–3. Each set of gears comprises three motor units that drive the main gear 22. The porting in the hydraulic motor is arranged so that fluid may be supplied to any one or any combination of gear sets so that either three pinions, six pinions, or nine pinions can drive the main gear 22. When using a constant supply of pressure fluid, maximum speed and minimum torque will be produced by the hydraulic motor when only one set of three pinions as set 1–1–1 is used to drive the main gear, and minimum speed and maximum torque will be produced by the hydraulic motor when three sets, specifically all nine of the pinions are used to drive the main gear. Thus, in the described embodiment of the invention three speed ranges are available even when a fixed displacement pump running at a constant speed is utilized with the motor.

It should be pointed out that any multiple of two or more pinions can be positioned about the main gear 22 and divided into any number of motor unit sets with two or more pinions spaced equally about the periphery of the main gear, and porting arranged so that any one or any combination of the motor unit sets can be supplied with pressure fluid to obtain any number of output speeds for the hydraulic motor. The two housing members 16 and 17 may also be provided with a single annular passageway whereby fluid is supplied to rotate all of the pinions surrounding the main gear at once and provide a constant output speed at maximum power.

FIGURE 10 shows a schematic diagram whereby hydraulic fluid can be supplied to different motor unit sets in the hydraulic motor to provide the various speed ranges. The valves are shown manually operated but it is to be understood that they can be solenoid operated, or by any other manner either remote or at the motor itself, or the valves built right into the motor housing if desired. A fixed displacement fluid pump 50 supplies fluid through a three position reversing valve 51 to three, two-position valves 52, 53 and 54 that are connected in parallel. One of the output ports of the valve 52 is connected to the opening 35 of the housing member 17 and the other output port connected to the opening 35a in the housing member 16. Similarly, the output ports of the valve 53 are connected to the openings 34 and 34a, and the output ports of valve 54 are connected to the openings 36 and 36a.

To operate the motor the valve 51 is shifted to direct fluid from the pump to each of the two-position valves 52, 53 and 54, and the two-position valves shifted to direct fluid to any one or combination of motor unit sets to rotate the pinions and drive the main gear and output shaft. As the valve 52 is shifted pressure fluid from the pump is directed through the opening 35 and the ports 41 to drive the motor units set consisting of equally spaced pinions designated 1–1–1 and is then discharged through the ports 41a, back through the valve 52 and the valve 51 to the tank. The motor unit sets consisting of the group of pinions 2–2–2 and 3–3–3 can be similarly driven or any combination of motor unit sets can be driven by operating their respective two-position valve members. If the reversing valve 51 is shifted to its third position, fluid from the pump can be directed through the valve 52 to the ports 41a to reverse the rotation of the pinion gears and drive the output shaft in the opposite direction.

Thus, by the simple valving arrangement shown and described, the hydraulic motor may be operated either clockwise or counterclockwise in any one of three speed ranges. The motor can be fixedly mounted to drive any desired load and can also be used as a torque arm whereby the load will be fixed and the motor floatingly mounted on a shaft to be driven. By utilizing a plurality of gear motor units, each meshing with a common central gear, the torque outputs of the individual gear motors are combined, and with the inherent gear reduction of the central gear, a low speed, high torque output is obtained from the hydraulic motor.

We claim:

1. A hydraulic motor comprising, a housing, a plurality of gear motor units in the housing, with a central gear common to all of said motor units, said motor units being in sets and equally spaced about the periphery of the central gear providing dynamic balance to the control gear, said housing having a plurality of separate and distinct fluid passages, a plurality of channels in the housing associated one with each of said motor units with the channels in sets and each set in communication with a fluid passage, and means to selectively supply pressure fluid to one or more of said passages to rotate the motor units connected therewith and drive said central gear.

2. In combination with a fixed displacement fluid pump, a fluid motor and means to vary the speed thereof comprising, a motor housing, an output shaft rotatable in said housing, a main gear loosely connected for rotation to said shaft and located within said housing, a plurality of pinion gears positioned about the periphery of the main gear and in driving connection therewith defining individual motor units, said motor units being sets; means to direct pressure fluid from said pump to a certain group of said pinion gears to rotate the gears and drive the output shaft at a certain speed, and means to direct fluid from said pump to additional groups of pinion gears to drive the output shaft at a different speed.

3. A hydraulic motor comprising, a housing, an output shaft rotatably mounted in said housing, a main gear loosely connected for rotation on said shaft, three sets of pinion gears equally positioned about the periphery of and in mesh with said main gear providing dynamic balance to the main gear and defining motor units with each having an inlet port and an outlet port, said housing having an annular internal fluid passageway in communication with said inlet ports, and means in the housing to discharge fluid from the outlet ports.

4. A hydraulic motor comprising, a housing, an output shaft rotatably mounted in said housing, a main gear loosely connected for rotation on said shaft, a plurality of pinion gears equally spaced about the periphery of and in mesh with said main gear to define three sets of motor units and provide dynamic balance to the main gear, said housing having three annular fluid passageways therein and a plurality of channels extending from said passageways and terminating at inlet ports for each motor unit, means to supply pressure fluid to said passageway and inlet ports, whereby said pinion gears are rotated driving the main gear and the shaft, and said housing having a second set of three annular passageways for receiving fluid from the motor units and directing fluid out of the housing.

5. A hydraulic motor comprising, a housing, a main output gear rotatable in said housing, a plurality of pinion gears each rotatable in a cavity provided in said housing and each mounted about the periphery of and in mesh with the main gear to each define a motor unit, a fluid inlet port and an outlet port in the housing for each motor unit, said housing having a plurality of separate annular fluid inlet passageways, a group of channels for each passageway, said motor units being in sets with one set having its inlet ports associated with one passageway by the group of channels associated therewith to supply pressure fluid to said set and rotate the gears, and a plurality of annular fluid outlet passageways in said housing each with a group of channels to associate a set of motor unit outlet ports with one of said outlet passageways to remove fluid from the gear cavities.

References Cited in the file of this patent

UNITED STATES PATENTS

| | | |
|---|---|---|
| 1,647,621 | Hawley | Nov. 1, 1927 |
| 2,399,008 | Doran | Apr. 23, 1946 |
| 2,839,889 | McGill | June 24, 1958 |

FOREIGN PATENTS

| | | |
|---|---|---|
| 801,941 | Great Britain | July 5, 1955 |
| 404,235 | Italy | June 4, 1943 |